(12) United States Patent
Zhang et al.

(10) Patent No.: US 12,184,388 B2
(45) Date of Patent: Dec. 31, 2024

(54) ABNORMAL OFFLINE STATE DETERMINING METHOD AND RELATED APPARATUS

(71) Applicant: HUAWEI TECHNOLOGIES CO., LTD., Guangdong (CN)

(72) Inventors: Chengchen Zhang, Shanghai (CN); Lin Shu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 17/686,470

(22) Filed: Mar. 4, 2022

(65) Prior Publication Data

US 2022/0271828 A1 Aug. 25, 2022

Related U.S. Application Data

(63) Continuation of application No. PCT/CN2020/113506, filed on Sep. 4, 2020.

(30) Foreign Application Priority Data

Sep. 5, 2019 (CN) .......................... 201910839687.0

(51) Int. Cl.
*H04W 4/40* (2018.01)
*H04B 7/185* (2006.01)
(Continued)

(52) U.S. Cl.
CPC ........ *H04B 7/18506* (2013.01); *H04W 24/04* (2013.01); *H04W 84/06* (2013.01)

(58) Field of Classification Search
None
See application file for complete search history.

(56) References Cited

U.S. PATENT DOCUMENTS

2016/0225264 A1* 8/2016 Taveira ................ G08G 5/0013
2018/0293901 A1* 10/2018 Chen ..................... G08G 5/006
(Continued)

FOREIGN PATENT DOCUMENTS

CN 102591358 A 7/2012
CN 104950907 A 9/2015
(Continued)

OTHER PUBLICATIONS

Chinese Office Action dated Jun. 22, 2022 for Application No. 201910839687, 10 pages.
(Continued)

*Primary Examiner* — Sithu Ko

(57) ABSTRACT

This application discloses an abnormal offline state determining method and a related apparatus. The method includes: An access and mobility management function network element (AMF) obtains location information when an uncrewed aerial vehicle enters or leaves an offline state. If a location indicated by the location information is outside a target offline area, the AMF marks a state of the uncrewed aerial vehicle as an abnormal offline state. The AMF sends a state identifier of the abnormal offline state to an unmanned aircraft system traffic management network element (UTM). Therefore, the location information when the uncrewed aerial vehicle enters or leaves the offline state is used to determine whether the uncrewed aerial vehicle is in the abnormal offline state, so that accuracy of determining the abnormal offline state of the uncrewed aerial vehicle can be improved to some extent.

17 Claims, 6 Drawing Sheets

(51) Int. Cl.
  *H04W 8/08* (2009.01)
  *H04W 24/04* (2009.01)
  *H04W 60/00* (2009.01)
  *H04W 84/06* (2009.01)

(56) References Cited

U.S. PATENT DOCUMENTS

| | | | | |
|---|---|---|---|---|
| 2018/0324662 | A1* | 11/2018 | Phuyal | H04W 48/18 |
| 2019/0019423 | A1 | 1/2019 | Choi et al. | |
| 2019/0246342 | A1* | 8/2019 | Wang | H04W 8/08 |
| 2020/0275513 | A1* | 8/2020 | Park | H04W 76/20 |
| 2021/0204104 | A1* | 7/2021 | Zhang | H04W 4/50 |
| 2021/0329460 | A1* | 10/2021 | Liao | H04W 12/37 |
| 2021/0331799 | A1* | 10/2021 | Hong | G08G 5/0013 |
| 2022/0046579 | A1* | 2/2022 | Hong | H04W 68/005 |
| 2022/0330197 | A1* | 10/2022 | Park | H04W 64/00 |

FOREIGN PATENT DOCUMENTS

| | | |
|---|---|---|
| CN | 107105051 A | 8/2017 |
| CN | 108650117 A | 10/2018 |
| CN | 108764653 A | 11/2018 |
| CN | 108780459 A | 11/2018 |
| CN | 109903589 A | 6/2019 |
| CN | 108291952 B | 7/2022 |
| KR | 1020190107648 * | 8/2019 |

OTHER PUBLICATIONS

European Supplementary Search Report for Application No. 20861686.2 dated Sep. 7, 2022, 12 pages.
PCT International Search Report for Application No. PCT/CN2020/113506 dated Sep. 4, 2020, 9 pages.

* cited by examiner

ABNORMAL OFFLINE STATE DETERMINING METHOD AND RELATED APPARATUS

CROSS-REFERENCE TO RELATED APPLICATIONS

This application is a continuation of International Patent Application No. PCT/CN2020/113506, filed on Sep. 4, 2020, which claims priority to Chinese Patent Application No. 201910839687.0, filed on Sep. 5, 2019. The disclosures of the aforementioned applications are hereby incorporated by reference in their entireties.

TECHNICAL FIELD

This application relates to the field of communication technologies, and in particular, to an abnormal offline state determining method and a related apparatus.

BACKGROUND

In recent years, an uncrewed aerial vehicle technology has developed rapidly. Especially, a civil uncrewed aerial vehicle has gradually become popular. In a process of formulating the 5th generation mobile communication technology (5G) standard protocol, the 3rd Generation Partnership Project (3GPP) standards organization has considered a networked uncrewed aerial vehicle as an important application scenario of 5G, and the networked uncrewed aerial vehicle attracts attention of many companies. However, short battery life of an uncrewed aerial vehicle has always been a technical problem to be resolved. For example, battery life of an uncrewed aerial vehicle on an existing market is usually between 10 to 30 minutes. When another power consumption module consumes same power, if connecting to a network consumes less power, overall battery life of the uncrewed aerial vehicle is longer.

In a scenario with a low real-time requirement, for example, logistics and routine inspection, energy consumption of the uncrewed aerial vehicle may be reduced by enabling the uncrewed aerial vehicle to enter an offline state in order to prolong the battery life of the uncrewed aerial vehicle, but the uncrewed aerial vehicle needs also to be prevented from entering an abnormal offline state. In an existing solution, the abnormal offline state of the uncrewed aerial vehicle is determined by configuring a maximum delay, and accuracy of determining the abnormal offline state of the uncrewed aerial vehicle in this existing solution is low.

SUMMARY

Embodiments of this application provide an abnormal offline state determining method and a related apparatus. Location information when an uncrewed aerial vehicle enters or leaves an offline state is used to determine whether the uncrewed aerial vehicle is in an abnormal offline state, so that accuracy of determining the abnormal offline state of the uncrewed aerial vehicle can be improved to some extent.

According to a first aspect, an embodiment of this application provides an abnormal offline state determining method. The method includes:

An access and mobility management function network element (AMF) obtains location information when an uncrewed aerial vehicle enters or leaves an offline state.

If a location indicated by the location information is outside a target offline area, the AMF marks a state of the uncrewed aerial vehicle as an abnormal offline state.

The AMF sends a state identifier of the abnormal offline state to an unmanned aircraft system traffic management network element (UTM).

In this example, whether the location indicated by the location information when the uncrewed aerial vehicle enters or leaves the offline state is in the target offline area is determined, and if the location indicated by the location information is outside the target offline area, it is determined that the state of the uncrewed aerial vehicle is the abnormal offline state. Therefore, compared with an existing solution in which a maximum delay is configured to determine whether the uncrewed aerial vehicle is in the abnormal offline state, the location information when the uncrewed aerial vehicle enters or leaves the offline state is used to determine whether the state of the uncrewed aerial vehicle is in the abnormal offline state, so that accuracy of determining the abnormal offline state can be improved to some extent.

Optionally, the method further includes:

The AMF receives a first message sent by the UTM, where the first message carries a first offline area.

The AMF determines the first offline area as the target offline area.

In this example, the AMF may obtain the first offline area from the first message received from the UTM, and determine the first offline area as the target offline area. Therefore, because the UTM may provide an external interface for an authorized third-party user, the third party user may perform configuration processing on the first offline area, so that convenience of configuring the target offline area of the uncrewed aerial vehicle by the third-party user can be improved to some extent.

Optionally, the method further includes:

The AMF receives a second message sent by a unified data management network element (UDM), where the second message carries a first offline area.

The AMF determines the first offline area as the target offline area.

In this example, the AMF may obtain the first offline area from the second message received from the UDM, and the first offline area is an offline area received by the UDM from the UTM. Therefore, because the UTM may provide an external interface for an authorized third-party user, the third party may perform configuration processing on the first offline area, so that convenience of configuring the target offline area of the uncrewed aerial vehicle by the third-party user can be improved to some extent.

Optionally, the method further includes:

The AMF receives a registration request sent by the uncrewed aerial vehicle, where the registration request carries a second offline area, and the second offline area is an offline area expected by the uncrewed aerial vehicle.

The AMF sends an authorization request to the UTM, where the authorization request carries the second offline area.

The AMF receives an authorization response sent by the UTM, where the authorization response carries a third offline area, the third offline area is an allowed offline area determined by the UTM based on the second offline area, and the AMF determines the third offline area as the target offline area.

The AMF sends a registration accept response to the uncrewed aerial vehicle, where the registration accept response carries the third offline area, and the registration accept response is used to indicate the uncrewed aerial vehicle to determine the third offline area as the target offline area.

In this example, the uncrewed aerial vehicle includes the second offline area in the registration request, where the second offline area is the offline area expected by the uncrewed aerial vehicle. The AMF sends the second offline area to the UTM, so the UTM determines the third offline area based on the second offline area. Therefore, the uncrewed aerial vehicle may apply for the second offline area from the AMF, and obtain the third offline area based on the applied second offline area, so that the target offline area (the third offline area) can be determined based on a requirement of the uncrewed aerial vehicle. In this way, flexibility of determining the target offline area can be improved to some extent, and on-demand allocation is implemented.

Optionally, the method further includes:

The AMF receives a registration request sent by the uncrewed aerial vehicle, where the registration request carries a second offline area, and the second offline area is an offline area expected by the uncrewed aerial vehicle.

The AMF sends a query request to a UDM.

The AMF receives a query response sent by the UDM, where the query response carries a subscribed offline area of the uncrewed aerial vehicle.

The AMF obtains a third offline area based on an allowed offline area determined based on the second offline area and the subscribed offline area of the uncrewed aerial vehicle, and the AMF determines the third offline area as the target offline area.

The AMF sends a registration accept response to the uncrewed aerial vehicle, where the registration accept response carries the third offline area, and the registration accept response is used to indicate the uncrewed aerial vehicle to determine the third offline area as the target offline area.

In this example, the uncrewed aerial vehicle includes the second offline area in the registration request. The AMF queries the UDM to obtain the subscribed offline area of the uncrewed aerial vehicle, and obtains the third offline area (the target offline area) based on the second offline area and the subscribed offline area. Therefore, the uncrewed aerial vehicle may apply for the second offline area from the AMF, and obtain the third offline area based on the applied offline area, so that the target offline area can be determined based on a requirement of the uncrewed aerial vehicle. In this way, flexibility of determining the target offline area can be improved to some extent, and on-demand allocation is implemented.

Optionally, the method further includes:

The AMF sends a third message to the uncrewed aerial vehicle, where the third message carries a fourth offline area, and the third message is used to indicate the uncrewed aerial vehicle to determine the fourth offline area as the target offline area.

In this example, the AMF directly sends the third message to the uncrewed aerial vehicle, to indicate the uncrewed aerial vehicle to determine the fourth offline area as the target offline area, so that the fourth offline area may be directly sent to the uncrewed aerial vehicle. Compared with a solution in which configuration is implemented through the UTM, the method in this example is more direct, and timeliness of determining the target offline area can be improved.

According to a second aspect, an embodiment of this application provides an abnormal offline state determining method. The method includes:

A UTM receives a state identifier that is of an abnormal offline state and that is sent by an AMF, where the state identifier of the abnormal offline state is used to indicate that when an uncrewed aerial vehicle enters or leaves an offline state, a location indicated by location information of the uncrewed aerial vehicle is outside a target offline area.

The UTM stores the state identifier of the abnormal offline state.

In this example, after receiving the state identifier that is of the abnormal offline state and that is sent by the AMF, the UTM stores the state identifier, so that a regulatory authority may query for the abnormal state of the uncrewed aerial vehicle. In this way, convenience of supervising the uncrewed aerial vehicle by the regulatory authority can be improved to some extent.

Optionally, the method further includes:

The UTM sends a first message to the AMF, where the first message carries a first offline area, and the first message is used to indicate the AMF to determine the first offline area as the target offline area.

In this example, the UTM may send the first message to the AMF, where the first message carries the first offline area. Because the UTM may provide an external interface for an authorized third-party user, the third party may perform configuration processing on the first offline area, so that convenience of configuring the target offline area of the uncrewed aerial vehicle by the third-party user can be improved to some extent.

Optionally, the method further includes:

The UTM receives an authorization request sent by the AMF, where the authorization request carries a second offline area, and the second offline area is an offline area expected by the uncrewed aerial vehicle.

The UTM determines an allowed offline area based on the second offline area, to obtain a third offline area.

The UTM sends an authorization response to the AMF, where the authorization response carries the third offline area, and the authorization response is used to indicate the AMF to determine the third offline area as the target offline area.

In this example, the UTM receives the second offline area sent by the AMF, where the second offline area is the offline area expected by the uncrewed aerial vehicle, and determines the third offline area based on the second offline area. Therefore, the uncrewed aerial vehicle may apply for the second offline area from the AMF, and obtain the third offline area (the target offline area) based on the applied second offline area, so that the target offline area can be determined based on a requirement of the uncrewed aerial vehicle. In this way, flexibility of determining the target offline area can be improved to some extent, and on-demand allocation is implemented.

Optionally, the method further includes:

The UTM sends a third message to the uncrewed aerial vehicle, where the third message carries a fourth offline area, and the third message is used to indicate the uncrewed aerial vehicle to determine the fourth offline area as the target offline area.

In this example, the UTM directly sends the third message to the uncrewed aerial vehicle, to indicate the uncrewed aerial vehicle to determine the fourth offline area as the target offline area, so that the fourth offline area may be directly sent to the uncrewed aerial vehicle, and efficiency of obtaining the target offline area by the uncrewed aerial vehicle can be improved to some extent.

Optionally, the method further includes:

The UTM sends a configuration update request to a UDM, where the configuration update request carries a first offline area of the uncrewed aerial vehicle, and the configuration update request is used to indicate the UDM to determine the first offline area of the uncrewed aerial vehicle as the target offline area.

The UTM receives a configuration update response sent by the UDM, where the configuration update response is used to indicate that the UDM has determined the first offline area as the target offline area.

In this example, the UTM sends the configuration update request to the UDM, and indicates the UDM to determine the first offline area as the target offline area. Because the UTM may provide an external interface for an authorized third-party user, the third-party user may perform configuration processing on the first offline area, so that convenience of configuring the target offline area of the uncrewed aerial vehicle by the third-party user can be improved to some extent.

According to a third aspect, an embodiment of this application provides an offline area determining method. The method includes:

A UDM receives a configuration update request sent by a UTM, where the configuration update request carries a first offline area of an uncrewed aerial vehicle.

The UDM determines the first offline area of the uncrewed aerial vehicle as a target offline area.

The UDM sends a configuration update response to the UTM, where the configuration update response is used to indicate that the UDM has determined the first offline area as the target offline area.

In this example, after receiving the configuration update request sent by the UTM, the UDM determines the first offline area of the uncrewed aerial vehicle as the target offline area, so that accuracy of determining an abnormal offline state can be improved by updating an offline area.

Optionally, the method further includes:

The UDM sends a second message to an AMF, where the second message carries the first offline area, and the second message is used to indicate the AMF to determine the first offline area as the target offline area.

Optionally, the method further includes:

The UDM receives a query request sent by an AMF.

The UDM sends a query response to the AMF, where the query response carries a subscribed offline area of the uncrewed aerial vehicle.

According to a fourth aspect, an embodiment of this application provides an offline area obtaining method. The method includes:

An uncrewed aerial vehicle sends a registration request to an AMF, where the registration request carries a second offline area, and the second offline area is an offline area expected by the uncrewed aerial vehicle.

The uncrewed aerial vehicle receives a registration accept response sent by the AMF, where the registration accept response carries a third offline area, and the third offline area is an allowed offline area determined by the AMF based on the second offline area and a subscribed offline area of the uncrewed aerial vehicle, or the third offline area is a third offline area received by the AMF.

The uncrewed aerial vehicle determines the third offline area as a target offline area.

Optionally, the method includes:

The uncrewed aerial vehicle receives a third message sent by the AMF, where the third message carries a fourth offline area.

The uncrewed aerial vehicle determines the fourth offline area as the target offline area.

Optionally, the method includes:

The uncrewed aerial vehicle receives a third message sent by a UTM, where the third message carries a fourth offline area.

The uncrewed aerial vehicle determines the fourth offline area as the target offline area.

According to a fifth aspect, an embodiment of this application provides a network device. The device includes an obtaining unit, a marking unit, and a sending unit.

The obtaining unit is configured to obtain location information when an uncrewed aerial vehicle enters or leaves an offline state.

The marking unit is configured to mark a state of the uncrewed aerial vehicle as an abnormal offline state if a location indicated by the location information is outside a target offline area.

The sending unit is configured to send a state identifier of the abnormal offline state to an unmanned aircraft system traffic management network element UTM.

Optionally, the device is further configured to:
receive a first message sent by the UTM, where the first message carries a first offline area; and
determine the first offline area as the target offline area.

Optionally, the device is further configured to:
receive a second message sent by a unified data management network element UDM, where the second message carries a first offline area; and
determine the first offline area as the target offline area.

Optionally, the device is further configured to:
receive a registration request sent by the uncrewed aerial vehicle, where the registration request carries a second offline area, and the second offline area is an offline area expected by the uncrewed aerial vehicle;
send an authorization request to the UTM, where the authorization request carries the second offline area;
receive an authorization response sent by the UTM, where the authorization response carries a third offline area, the third offline area is an allowed offline area determined by the UTM based on the second offline area, and determine the third offline area as the target offline area; and
send a registration accept response to the uncrewed aerial vehicle, where the registration accept response carries the third offline area, and the registration accept response is used to indicate the uncrewed aerial vehicle to determine the third offline area as the target offline area.

Optionally, the device is further configured to:
receive a registration request sent by the uncrewed aerial vehicle, where the registration request carries a second offline area, and the second offline area is an offline area expected by the uncrewed aerial vehicle;
send a query request to a UDM;
receive a query response sent by the UDM, where the query response carries a subscribed offline area of the uncrewed aerial vehicle;
obtain a third offline area based on an allowed offline area determined based on the second offline area and the subscribed offline area of the uncrewed aerial vehicle, and determine the third offline area as the target offline area; and
send a registration accept response to the uncrewed aerial vehicle, where the registration accept response carries the third offline area, and the registration accept response is used to indicate the uncrewed aerial vehicle to determine the third offline area as the target offline area.

Optionally, the device is further configured to:

send a third message to the uncrewed aerial vehicle, where the third message carries a fourth offline area, and the third message is used to indicate the uncrewed aerial vehicle to determine the fourth offline area as the target offline area.

According to a sixth aspect, an embodiment of this application provides a network device. The device includes a receiving unit and a storage unit.

The receiving unit is configured to receive a state identifier that is of an abnormal offline state and that is sent by an AMF, where the state identifier of the abnormal offline state is used to indicate that when an uncrewed aerial vehicle enters or leaves an offline state, a location indicated by location information of the uncrewed aerial vehicle is outside a target offline area.

The storage unit is configured to store the state identifier of the abnormal offline state.

Optionally, the device is further configured to:

send a first message to the AMF, where the first message carries a first offline area, and the first message is used to indicate the AMF to determine the first offline area as the target offline area.

Optionally, the device is further configured to:

receive an authorization request sent by the AMF, where the authorization request carries a second offline area, and the second offline area is an offline area expected by the uncrewed aerial vehicle;

determine an allowed offline area based on the second offline area, to obtain a third offline area; and send an authorization response to the AMF, where the authorization response carries the third offline area, and the authorization response is used to indicate the AMF to determine the third offline area as the target offline area.

Optionally, the device is further configured to:

send a third message to the uncrewed aerial vehicle, where the third message carries a fourth offline area, and the third message is used to indicate the uncrewed aerial vehicle to determine the fourth offline area as the target offline area.

Optionally, the device is further configured to:

send a configuration update request to a UDM, where the configuration update request carries a first offline area of the uncrewed aerial vehicle, and the configuration update request is used to indicate the UDM to determine the first offline area of the uncrewed aerial vehicle as the target offline area; and receive a configuration update response sent by the UDM, where the configuration update response is used to indicate that the UDM has determined the first offline area as the target offline area.

According to a seventh aspect, an embodiment of this application provides a network device. The device includes a receiving unit, an update unit, and a sending unit.

The receiving unit is configured to receive a configuration update request sent by a UTM, where the configuration update request carries a first offline area of an uncrewed aerial vehicle.

The update unit is configured to determine the first offline area of the uncrewed aerial vehicle as a target offline area.

The sending unit is configured to send a configuration update response to the UTM, where the configuration update response is used to indicate that a UDM has determined the first offline area as the target offline area.

Optionally, the device is further configured to:

send a second message to an AMF, where the second message carries the first offline area, and the second message is used to indicate the AMF to determine the first offline area as the target offline area.

Optionally, the device is further configured to:

receive a query request sent by an AMF; and send a query response to the AMF, where the query response carries a subscribed offline area of the uncrewed aerial vehicle.

According to an eighth aspect, an embodiment of this application provides an uncrewed aerial vehicle. The uncrewed aerial vehicle includes a sending unit, a receiving unit, and a determining unit.

The sending unit is configured to send a registration request to an AMF, where the registration request carries a second offline area, and the second offline area is an offline area expected by the uncrewed aerial vehicle.

The receiving unit is configured to receive a registration accept response sent by the AMF, where the registration accept response carries a third offline area, and the third offline area is an allowed offline area determined by the AMF based on the second offline area and a subscribed offline area of the uncrewed aerial vehicle, or the third offline area is a third offline area received by the AMF.

The determining unit is configured to determine the third offline area as a target offline area.

Optionally, the uncrewed aerial vehicle is further configured to:

receive a third message sent by the AMF, where the third message carries a fourth offline area; and determine the fourth offline area as the target offline area.

Optionally, the uncrewed aerial vehicle is further configured to:

receive a third message sent by a UTM, where the third message carries a fourth offline area; and determine the fourth offline area as the target offline area.

According to a ninth aspect, an embodiment of this application provides a communication system. The communication system includes the network device according to the fifth aspect, the network device according to the sixth aspect, the network device according to the seventh aspect, and the uncrewed aerial vehicle according to the eighth aspect.

According to a tenth aspect, an embodiment of this application provides a communication system. The communication system includes an AMF and a UTM.

The AMF is configured to: obtain location information when an uncrewed aerial vehicle enters or leaves an offline state; if a location indicated by the location information is outside a target offline area, mark a state of the uncrewed aerial vehicle as an abnormal offline state; and send a state identifier of the abnormal offline state to the UTM.

The UTM is configured to: receive the state identifier that is of the abnormal offline state and that is sent by the AMF; and store the state identifier of the abnormal offline state.

Optionally, the AMF is further configured to:

receive a first message sent by the UTM, where the first message carries a first offline area; and determine the first offline area as the target offline area.

Optionally, the AMF is further configured to:

receive a second message sent by a unified data management network element UDM, where the second message carries a first offline area; and determine the first offline area as the target offline area.

Optionally, the AMF is further configured to:
receive a registration request sent by the uncrewed aerial vehicle, where the registration request carries a second offline area, and the second offline area is an offline area expected by the uncrewed aerial vehicle;
send an authorization request to the UTM, where the authorization request carries the second offline area;
receive an authorization response sent by the UTM, where the authorization response carries a third offline area, the third offline area is an allowed offline area determined by the UTM based on the second offline area, and determine the third offline area as the target offline area; and
send a registration accept response to the uncrewed aerial vehicle, where the registration accept response carries the third offline area, and the registration accept response is used to indicate the uncrewed aerial vehicle to determine the third offline area as the target offline area.

Optionally, the AMF is further configured to:
receive a registration request sent by the uncrewed aerial vehicle, where the registration request carries a second offline area, and the second offline area is an offline area expected by the uncrewed aerial vehicle;
send a query request to a UDM;
receive a query response sent by the UDM, where the query response carries a subscribed offline area of the uncrewed aerial vehicle;
obtain a third offline area based on an allowed offline area determined based on the second offline area and the subscribed offline area of the uncrewed aerial vehicle, and determine the third offline area as the target offline area; and
send a registration accept response to the uncrewed aerial vehicle, where the registration accept response carries the third offline area, and the registration accept response is used to indicate the uncrewed aerial vehicle to determine the third offline area as the target offline area.

Optionally, the AMF is further configured to:
send a third message to the uncrewed aerial vehicle, where the third message carries a fourth offline area, and the third message is used to indicate the uncrewed aerial vehicle to determine the fourth offline area as the target offline area.

Optionally, the UTM is further configured to:
send the first message to the AMF, where the first message carries the first offline area, and the first message is used to indicate the AMF to determine the first offline area as the target offline area.

Optionally, the UTM is further configured to:
receive the authorization request sent by the AMF, where the authorization request carries the second offline area, and the second offline area is the offline area expected by the uncrewed aerial vehicle;
determine the allowed offline area based on the second offline area, to obtain the third offline area; and
send the authorization response to the AMF, where the authorization response carries the third offline area, and the authorization response is used to indicate the AMF to determine the third offline area as the target offline area.

Optionally, the UTM is further configured to:
send a third message to the uncrewed aerial vehicle, where the third message carries a fourth offline area, and the third message is used to indicate the uncrewed aerial vehicle to determine the fourth offline area as the target offline area.

Optionally, the UTM is further configured to:
send a configuration update request to a UDM, where the configuration update request carries a first offline area of the uncrewed aerial vehicle, and the configuration update request is used to indicate the UDM to determine the first offline area of the uncrewed aerial vehicle as the target offline area; and
receive a configuration update response sent by the UDM, where the configuration update response is used to indicate that the UDM has determined the first offline area as the target offline area.

Optionally, the system further includes the UDM. The UDM is configured to: receive the configuration update request sent by the UTM, where the configuration update request carries the first offline area of the uncrewed aerial vehicle; determine the first offline area of the uncrewed aerial vehicle as the target offline area; and send the configuration update response to the UTM, where the configuration update response is used to indicate that the UDM has determined the first offline area as the target offline area.

Optionally, the UTM is further configured to:
send a second message to an AMF, where the second message carries a first offline area, and the second message is used to indicate the AMF to determine the first offline area as the target offline area.

Optionally, the UTM is further configured to:
receive a query request sent by the AMF; and
send a query response to the AMF, where the query response carries a subscribed offline area of the uncrewed aerial vehicle.

Optionally, the system further includes the uncrewed aerial vehicle. The uncrewed aerial vehicle is configured to: receive the registration accept response sent by the AMF, where the registration accept response carries the third offline area, and the third offline area is the allowed offline area determined by the AMF based on the second offline area and the subscribed offline area of the uncrewed aerial vehicle, or the third offline area is a third offline area received by the AMF; and determine the third offline area as the target offline area.

Optionally, the uncrewed aerial vehicle is further configured to:
receive the third message sent by the AMF, where the third message carries the fourth offline area; and
determine the fourth offline area as the target offline area.

Optionally, the uncrewed aerial vehicle is further configured to:
receive the third message sent by the UTM, where the third message carries the fourth offline area; and
determine the fourth offline area as the target offline area.

According to an eleventh aspect, an embodiment of this application provides a communication method. The method includes:

An AMF obtains location information when an uncrewed aerial vehicle enters or leaves an offline state.

If a location indicated by the location information is outside a target offline area, the AMF marks a state of the uncrewed aerial vehicle as an abnormal offline state.

The AMF sends a state identifier of the abnormal offline state to an unmanned aircraft system traffic management network element UTM.

The UTM receives the state identifier that is of the abnormal offline state and that is sent by the AMF.

The UTM stores the state identifier of the abnormal offline state.

Optionally, the method further includes:

The AMF receives a first message sent by the UTM, where the first message carries a first offline area.

The AMF determines the first offline area as the target offline area.

Optionally, the method further includes:

The AMF receives a second message sent by a unified data management network element UDM, where the second message carries a first offline area.

The AMF determines the first offline area as the target offline area.

Optionally, the method further includes:

The AMF receives a registration request sent by the uncrewed aerial vehicle, where the registration request carries a second offline area, and the second offline area is an offline area expected by the uncrewed aerial vehicle.

The AMF sends an authorization request to the UTM, where the authorization request carries the second offline area.

The AMF receives an authorization response sent by the UTM, where the authorization response carries a third offline area, the third offline area is an allowed offline area determined by the UTM based on the second offline area, and the AMF determines the third offline area as the target offline area.

The AMF sends a registration accept response to the uncrewed aerial vehicle, where the registration accept response carries the third offline area, and the registration accept response is used to indicate the uncrewed aerial vehicle to determine the third offline area as the target offline area.

Optionally, the method further includes:

The AMF receives a registration request sent by the uncrewed aerial vehicle, where the registration request carries a second offline area, and the second offline area is an offline area expected by the uncrewed aerial vehicle.

The AMF sends a query request to a UDM.

The AMF receives a query response sent by the UDM, where the query response carries a subscribed offline area of the uncrewed aerial vehicle.

The AMF obtains a third offline area based on an allowed offline area determined based on the second offline area and the subscribed offline area of the uncrewed aerial vehicle, and the AMF determines the third offline area as the target offline area.

The AMF sends a registration accept response to the uncrewed aerial vehicle, where the registration accept response carries the third offline area, and the registration accept response is used to indicate the uncrewed aerial vehicle to determine the third offline area as the target offline area.

Optionally, the method is further configured to:

The AMF sends a third message to the uncrewed aerial vehicle, where the third message carries a fourth offline area, and the third message is used to indicate the uncrewed aerial vehicle to determine the fourth offline area as the target offline area.

Optionally, the method further includes:

The UTM sends the first message to the AMF, where the first message carries the first offline area, and the first message is used to indicate the AMF to determine the first offline area as the target offline area.

Optionally, the method further includes:

The UTM receives the authorization request sent by the AMF, where the authorization request carries the second offline area, and the second offline area is the offline area expected by the uncrewed aerial vehicle;

The UTM determines the allowed offline area based on the second offline area, to obtain the third offline area.

The UTM sends the authorization response to the AMF, where the authorization response carries the third offline area, and the authorization response is used to indicate the AMF to determine the third offline area as the target offline area.

Optionally, the method further includes:

The UTM sends a third message to the uncrewed aerial vehicle, where the third message carries a fourth offline area, and the third message is used to indicate the uncrewed aerial vehicle to determine the fourth offline area as the target offline area.

Optionally, the method further includes:

The UTM sends a configuration update request to a UDM, where the configuration update request carries a first offline area of the uncrewed aerial vehicle, and the configuration update request is used to indicate the UDM to determine the first offline area of the uncrewed aerial vehicle as the target offline area.

The UTM receives a configuration update response sent by the UDM, where the configuration update response is used to indicate that the UDM has determined the first offline area as the target offline area.

Optionally, the method further includes:

The UDM receives the configuration update request sent by the UTM, where the configuration update request carries the first offline area of the uncrewed aerial vehicle.

The UDM determines the first offline area of the uncrewed aerial vehicle as the target offline area.

The UDM sends the configuration update response to the UTM, where the configuration update response is used to indicate that the UDM has determined the first offline area as the target offline area.

Optionally, the method further includes:

The UDM sends the second message to the AMF, where the second message carries the first offline area, and the second message is used to indicate the AMF to determine the first offline area as the target offline area.

Optionally, the method further includes:

The UDM receives the query request sent by the AMF.

The UDM sends the query response to the AMF, where the query response carries the subscribed offline area of the uncrewed aerial vehicle.

Optionally, the method further includes:

The uncrewed aerial vehicle sends the registration request to the AMF, where the registration request carries the second offline area, and the second offline area is the offline area expected by the uncrewed aerial vehicle.

The uncrewed aerial vehicle receives the registration accept response sent by the AMF, where the registration accept response carries the third offline area, and the third offline area is the allowed offline area determined by the AMF based on the second offline area and the subscribed offline area of the uncrewed aerial vehicle, or the third offline area is the third offline area received by the AMF.

The uncrewed aerial vehicle determines the third offline area as the target offline area.

Optionally, the method includes:

The uncrewed aerial vehicle receives the third message sent by the AMF, where the third message carries the fourth offline area.

The uncrewed aerial vehicle determines the fourth offline area as the target offline area.

Optionally, the method includes:

The uncrewed aerial vehicle receives the third message sent by the UTM, where the third message carries the fourth offline area.

The uncrewed aerial vehicle determines the fourth offline area as the target offline area.

According to a twelfth aspect, an embodiment of this application provides a computer storage medium. The computer storage medium stores a computer program, and the computer program includes program instructions. When the program instructions are executed by a processor, the processor is enabled to perform all or some of the methods shown in the first aspect, the second aspect, the third aspect, and the fourth aspect.

According to a thirteenth aspect, an embodiment of this application provides a computer program product. The computer program product includes a non-transitory computer-readable storage medium storing a computer program. The computer program may be operated to enable a computer to perform some or all of the steps described in the first aspect, the second aspect, the third aspect, and the fourth aspect of the embodiments of this application. The computer program product may be a software installation package.

These aspects or other aspects of this application are clearer and more comprehensible in the following descriptions of the embodiments.

BRIEF DESCRIPTION OF DRAWINGS

To describe the technical solutions in the embodiments of this application or in the prior art more clearly, the following briefly describes the accompanying drawings used in describing the embodiments or the prior art. It is clear that the accompanying drawings in the following descriptions show some embodiments of this application, and a person of ordinary skill in the art may still derive other drawings from these accompanying drawings without creative efforts.

DESCRIPTION OF EMBODIMENTS

The following describes embodiments of this application with reference to the accompanying drawings.

In the embodiments of this application, to resolve an existing problem in uncrewed aerial vehicle management that accuracy of determining whether an uncrewed aerial vehicle is in an abnormal offline state by configuring a maximum delay is low, location information when the uncrewed aerial vehicle leaves or enters an offline state is used to determine whether a state of the uncrewed aerial vehicle is the abnormal offline state, so that accuracy of determining the abnormal offline state can be improved.

The following abbreviations are used in the embodiments of this application: 5G, AMF, UTM, UDM, MICO, 3GPP, UDR, NEF, and (R)AN. 5G: 5th generation mobile communication technology (5th generation mobile network); AMF: access and mobility management function network element; UTM: unmanned aircraft system traffic management network element; UDM: unified data management network element; MICO: mobile initiated connection only; 3GPP: 3rd Generation Partnership Project; UDR: unified data repository network element; NEF: network exposure function network element; and (R)AN: (radio) access network.

An area mentioned in this application may be a combination of a tracking area (TA) and a height range, or a combination of a longitude and latitude range and a height range, or another combination of possible ranges in a horizontal direction and a vertical direction, and may be regular or irregular. This is not limited herein.

Figure 1:
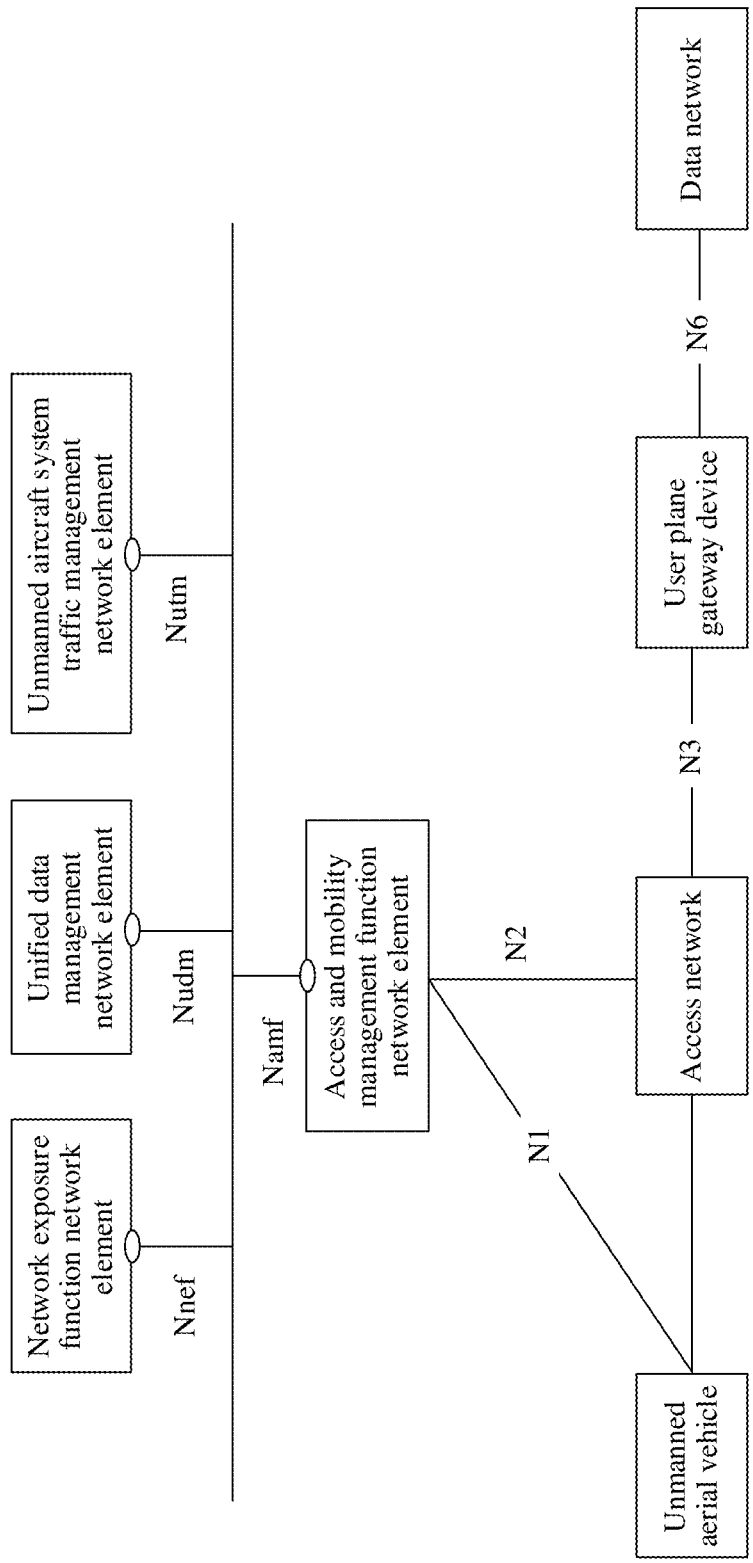
FIG. 1 is a schematic diagram of an architecture of a 5G system according to an embodiment of this application.

To better understand an abnormal offline state determining method provided in the embodiments of this application, the following first briefly describes a 5G system to which the abnormal offline state determining method is applied. FIG. 1 is a schematic diagram of an architecture of a 5G system according to an embodiment of this application. As shown in FIG. 1, the 5G system includes an uncrewed aerial vehicle, an access and mobility management network element (AMF), a unified data management network element (UDM), and an unmanned aircraft system traffic management network element (UTM). The UTM may be an independent network element, or may be a series of functions. These functions may exist in an existing network element or a subsequently newly added network element. An existence form of the UTM is not limited in this application. The AMF obtains location information when the uncrewed aerial vehicle enters or leaves an offline state, where the location information may be location information reported to the AMF when the uncrewed aerial vehicle leaves or enters the offline state, and the location information may be reported through interface N1 or interface N2. If a location indicated by the location information is outside a target offline area, the AMF marks a state of the uncrewed aerial vehicle as an abnormal offline state, where the target offline area may be an offline area set by the AMF, an offline area received by the AMF, or the like, and the target offline area is an area in which a network side allows the uncrewed aerial vehicle to enter the offline state. The AMF sends a state identifier of the abnormal offline state to the UTM. The uncrewed aerial vehicle stores the target offline area. When obtaining the target offline area, the uncrewed aerial vehicle may obtain the target offline area in a local configuration manner, may obtain the target offline area from a data network through interface N3 and interface N6, may obtain the target offline area from the AMF through interface N1, or may directly obtain the target offline area from the UTM and the UDM. Certainly, the uncrewed aerial vehicle may alternatively obtain the target offline area from the AMF by sending a registration request. The target offline area may be understood as that the uncrewed aerial vehicle is allowed to be in the offline state in the area, that is, the uncrewed aerial vehicle is not allowed to be in the offline state outside a first online area. The area herein may be an independent area, or may be an area list including a plurality of areas. This is not limited in this application.

Figure 2:
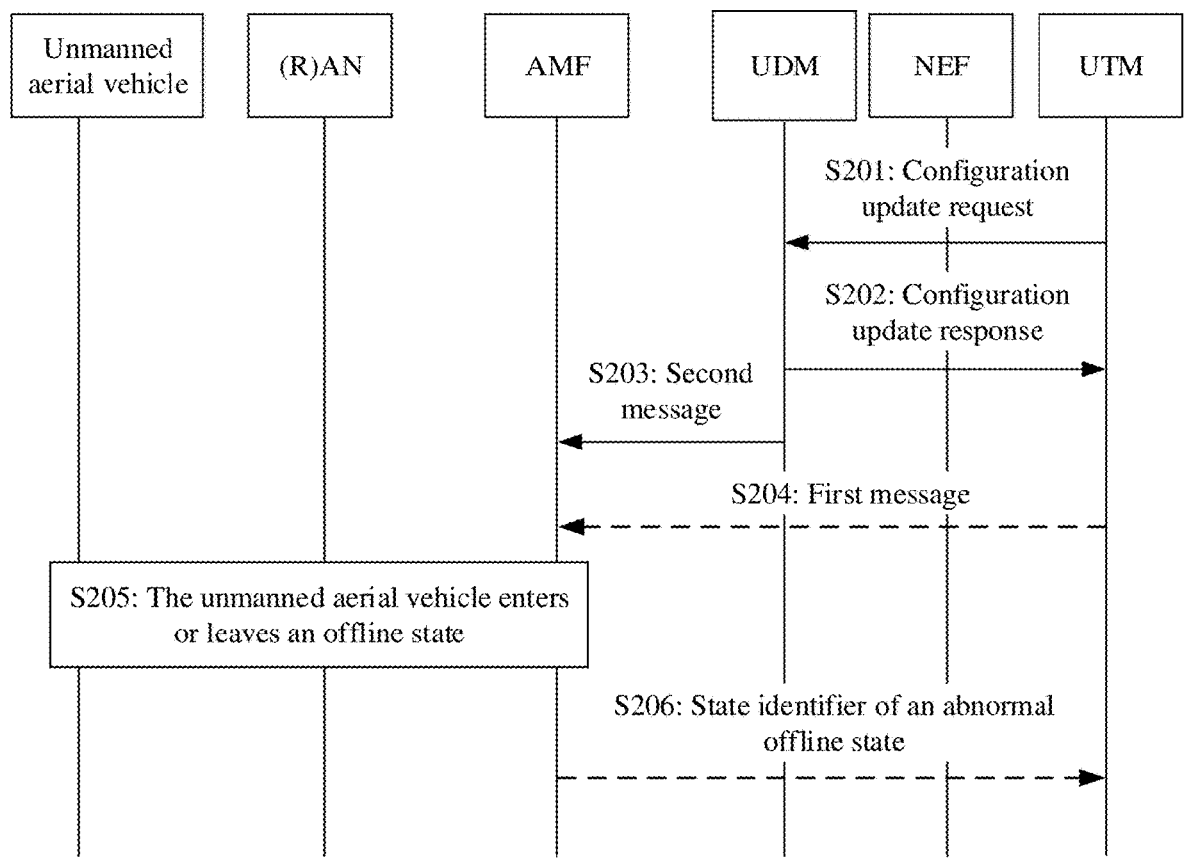
FIG. 2 is a schematic interaction diagram of an abnormal offline state determining method according to an embodiment of this application.

FIG. 2 is a schematic interaction diagram of an abnormal offline state determining method according to an embodiment of this application. As shown in FIG. 2, the method includes steps S201 to S206 as follows.

S201: A UTM sends a configuration update request to a UDM.

The configuration update request carries a first offline area in which an uncrewed aerial vehicle is allowed to enter an offline state. The first offline area herein means that the uncrewed aerial vehicle is allowed to be in the offline state in the area, that is, the uncrewed aerial vehicle is not allowed to be in the offline state outside a first online area. The area herein may be an independent area, or may be an area list including a plurality of areas. This is not limited in this application.

Optionally, the configuration update request may further carry an identification of an area in which the uncrewed aerial vehicle is not allowed to enter the offline state. The area in which the uncrewed aerial vehicle is not allowed to enter the offline state is used as a basis for determining whether a state of the uncrewed aerial vehicle is an abnormal offline state. Specifically, the determining whether a state of the uncrewed aerial vehicle is an abnormal offline state may be: determining whether a location indicated by location information when the uncrewed aerial vehicle enters or leaves the offline state is in the area in which the uncrewed aerial vehicle is not allowed to enter the offline state, and if the location indicated by the location information is in the area in which the uncrewed aerial vehicle is not allowed to enter the offline state, determining that the state of the uncrewed aerial vehicle is the abnormal offline state.

Optionally, before the UTM sends the configuration update request to the UDM, an AMF may further send a parameter update subscription message to the UDM, where the parameter update subscription message is used to notify, when subscription data of a specific parameter in the UDM changes, the AMF that the subscription data has changed. The subscription data in this embodiment of this application may include offline information of the uncrewed aerial vehicle. The offline information may be, for example, information related to entering/being in/leaving the offline state by the uncrewed aerial vehicle, for example, a target offline area in which the uncrewed aerial vehicle is allowed to enter the offline state and a maximum delay. The maximum delay may be understood as maximum duration in which the uncrewed aerial vehicle is allowed to be in the offline state. After the uncrewed aerial vehicle enters the offline state, if the uncrewed aerial vehicle still does not leave the offline state after the maximum delay is exceeded, abnormal offline may occur.

The offline state mentioned in this application may be understood as a state in which the uncrewed aerial vehicle does not communicate with a 3GPP network for a long time. Optionally, the offline state may mean that a network side accepts that the uncrewed aerial vehicle uses a MICO mode and the uncrewed aerial vehicle is in an IDLE state, or the uncrewed aerial vehicle is in an eDRX energy saving state, or the uncrewed aerial vehicle is in another state in which the uncrewed aerial vehicle does not continuously communicate with the 3GPP network for a long time. For example, if the offline state means that the network side accepts that the uncrewed aerial vehicle uses the MICO mode and is in the IDLE state, that the uncrewed aerial vehicle enters the offline state means that the uncrewed aerial vehicle is authorized by the network to use the MICO mode, and the uncrewed aerial vehicle changes from a CONNECTED state to the IDLE state.

Optionally, the configuration update request may further carry an uncrewed aerial vehicle identifier, and is used to update an offline area of the uncrewed aerial vehicle corresponding to the uncrewed aerial vehicle identifier. The configuration update request may further carry the maximum delay.

Optionally, the configuration update request may include a plurality of uncrewed aerial vehicle identifiers, and an offline area may be updated on uncrewed aerial vehicles corresponding to the plurality of uncrewed aerial vehicle identifiers. If the configuration update request does not carry the uncrewed aerial vehicle identifier, it indicates that the offline area is used for all uncrewed aerial vehicles managed by the AMF.

Optionally, the UTM may further send the configuration update request to an NEF, and if the NEF allows the UTM to update the offline area, the NEF forwards the configuration update request to the UDM.

S202: The UDM sends a configuration update response to the UTM.

When determining that the subscription data of the uncrewed aerial vehicle needs to be updated, the UDM updates the subscription data of the uncrewed aerial vehicle. For example, when that the target offline area in which the uncrewed aerial vehicle is allowed to enter the offline state needs to be updated is determined, the first offline area carried in the configuration update request is determined as the target offline area, and then the configuration update response is sent to the UTM. The configuration update response is used to indicate that the UDM has determined the first offline area as the target offline area. That the first offline area is determined as the target offline area may be understood as: If the target offline area does not exist in the subscription information, the first offline area is used as the target offline area; if the target offline area exists in the subscription information, the target offline area is updated with the first offline area.

Optionally, before the UDM determines the first offline area as the target offline area, the UDM may send a query request to a UDR, and determine, based on a query response sent by the UDR, whether the offline information, for example, the target offline area and the maximum delay, can be updated. If a determining result is that the offline information, for example, the target offline area and the maximum delay, can be updated, the offline information, for example, the target offline area and the maximum delay, is updated; if a determining result is that the offline information, for example, the target offline area and the maximum delay, cannot be updated, no update is performed.

Optionally, before updating the target offline area, if the UDM determines that the offline information needs to be updated and the offline information is allowed to be updated, the UDM may send a subscription data update request to the UDR. The update request is used to update the offline information, for example, the target offline area. If the UDR determines that update needs to be performed, the UDR feeds back a response indicating to perform update; if the UDR determines that no update needs to be performed, the UDR feeds back a response indicating not to perform update.

Optionally, a method in which the UDM sends the configuration update response to the UTM may be: directly sending the configuration update response to the UTM, or sending the configuration update response to the UTM through the NEF.

S203: The UDM sends a second message to the AMF.

The second message carries the first offline area, and may further carry the uncrewed aerial vehicle identifier, the maximum delay, and the like.

Optionally, after receiving the second message, the AMF sets a target offline area and a maximum delay that are of the uncrewed aerial vehicle corresponding to the uncrewed aerial vehicle identifier based on the uncrewed aerial vehicle identifier carried in the second message. When the target offline area is set, the first offline area is used for setting, and when the maximum delay is set, the received maximum delay is used for setting.

S204: The UTM sends a first message to the AMF.

The first message carries the first offline area, and the first message may further carry the uncrewed aerial vehicle identifier and the maximum delay. After receiving the first message, the AMF sets the target offline area and the maximum delay that are of the uncrewed aerial vehicle corresponding to the uncrewed aerial vehicle identifier based on the uncrewed aerial vehicle identifier carried in the second message. When the target offline area is set, the first offline area is used for setting, and when the maximum delay is set, the received maximum delay is used for setting.

Steps S201 to S203 and step S204 are not performed in a single manner. That is, if S204 is performed, steps S201 to S203 may not be performed, or step S204 is not performed and steps S201 to S203 are performed. This is not specifically limited herein.

Optionally, in this embodiment of this application, when the target offline area is sent to the uncrewed aerial vehicle, the target offline area is not sent by using signaling, but may be sent by using an SMS message, through a data network, or the like.

S205: The uncrewed aerial vehicle enters or leaves the offline state.

Optionally, after the uncrewed aerial vehicle enters or leaves the offline state, the AMF cannot directly determine a state of the uncrewed aerial vehicle, and the AMF needs to determine whether the uncrewed aerial vehicle enters or leaves the offline state. If that the uncrewed aerial vehicle enters the offline state means that the uncrewed aerial vehicle has been authorized to use the MICO mode and enters the IDLE state, a possible method for determining that the uncrewed aerial vehicle enters the offline state is: If a (R)AN detects that the uncrewed aerial vehicle actively releases a connection or detects that the uncrewed aerial vehicle does not transmit data or signaling within a specific period of time, the (R)AN initiates an N2 connection release request to the AMF. The AMF identifies that the uncrewed aerial vehicle enters the IDLE state, and therefore identifies that the UE enters the offline state. A method for determining that the uncrewed aerial vehicle leaves the offline state may be: The uncrewed aerial vehicle enters the connected state, that is, after receiving a service request message sent by the uncrewed aerial vehicle, the AMF identifies that the uncrewed aerial vehicle enters the connected state, and therefore determines that the uncrewed aerial vehicle leaves the offline state.

S206: The AMF sends a state identifier of the abnormal offline state of the uncrewed aerial vehicle to the UTM.

The state identifier of the abnormal offline state is used to indicate that when the uncrewed aerial vehicle enters or leaves the offline state, the location indicated by the location information of the uncrewed aerial vehicle is outside the target offline area.

Optionally, when sending the state identifier of the abnormal offline state of the uncrewed aerial vehicle to the UTM, the AMF also carries information such as the uncrewed aerial vehicle identifier and a time and a place at which the uncrewed aerial vehicle enters or leaves the offline state.

Optionally, before the AMF sends the state identifier of the abnormal offline state of the uncrewed aerial vehicle to the UTM, the AMF needs to determine the state of the uncrewed aerial vehicle. A possible method for determining the abnormal offline state includes steps A1 to A3, which are as follows:

A1: The access and mobility management function network element (AMF) obtains the location information when the uncrewed aerial vehicle enters or leaves the offline state.

A2: If the location indicated by the location information is outside the target offline area, the AMF marks the state of the uncrewed aerial vehicle as the abnormal offline state.

A3: The AMF sends the state identifier of the abnormal offline state to the unmanned aircraft system traffic management network element (UTM).

A method in which the AMF obtains the location information when the uncrewed aerial vehicle enters or leaves the offline state may be: The uncrewed aerial vehicle may directly report the location information when entering or leaving the offline state, or the AMF obtains the location information of the uncrewed aerial vehicle in a network-assisted manner. A manner for obtaining the location information of the uncrewed aerial vehicle is not limited herein.

Optionally, to avoid a signaling burst, the AMF may take specific measures. For example, the state identifier of the abnormal offline state is centrally sent to the UTM when that a plurality of uncrewed aerial vehicles enter the abnormal offline state is collected, or an abnormal offline condition of an uncrewed aerial vehicle in a specific area is periodically sent to the UTM.

Optionally, a method for determining whether the location indicated by the location information is outside the target offline area may be: comparing the location indicated by the location information with the target offline area, and if the location indicated by the location information does not exist in the target offline area, determining that the location indicated by the location information is outside the target offline area. If the location indicated by the location information is located at a boundary of the target offline area, it is also determined that the location indicated by the location information is outside the target offline area.

Optionally, the UTM receives the state identifier that is of the abnormal offline state of the uncrewed aerial vehicle and that is sent by the AMF, and stores the state identifier of the abnormal offline state.

Optionally, another possible method for determining that the state of the uncrewed aerial vehicle is the abnormal offline state may be: determining whether the location indicated by the location information when the uncrewed aerial vehicle enters or leaves the offline state is in the area in which the uncrewed aerial vehicle is not allowed to enter the offline state, and if the location indicated by the location information is in the area in which the uncrewed aerial vehicle is not allowed to enter the offline state, determining that the state of the uncrewed aerial vehicle is the abnormal offline state.

Optionally, after storing the state identifier of the abnormal offline state, the UTM may perform further processing. Examples are provided below: (1) Information that the uncrewed aerial vehicle is in the abnormal offline state may be transferred to an authorized third party, where the authorized third party may be an air traffic control department, a law enforcement agency, or the like. The authorized third party may further monitor or take a coercive measure on the uncrewed aerial vehicle based on the information, for example, directly destroy the uncrewed aerial vehicle, perform signal shielding, or directly take over control of the uncrewed aerial vehicle. (2) The UTM may further send warning information to an owner of the uncrewed aerial vehicle through an application layer or in another manner, for example, by using an SMS, to request the owner to quickly adjust the location or the offline state of the uncrewed aerial vehicle. (3) The UTM may further send a deactivation offline message to the AMF by using signaling, where the message is used to indicate the AMF to deactivate the offline state of the uncrewed aerial vehicle, that is, the uncrewed aerial vehicle is no longer allowed to enter the offline state. If the uncrewed aerial vehicle is reachable, the AMF directly sends the deactivation offline message to the uncrewed aerial vehicle, where the message is used to deactivate the offline state of the uncrewed aerial vehicle, that is, to indicate that the uncrewed aerial vehicle can no longer enter the offline state. If the uncrewed aerial vehicle is unreachable, the AMF sends the deactivation offline message to the uncrewed aerial vehicle when the uncrewed aerial vehicle is reachable. After receiving the deactivation offline message, the uncrewed aerial vehicle sends a response message to the AMF, where the response message confirms that the offline state has been deactivated. After receiving the response message, the AMF sends a response message to the UTM.

In this example, whether the location indicated by the location information when the uncrewed aerial vehicle enters or leaves the offline state is in the target offline area is determined, and if the location indicated by the location information is outside the target offline area, it is determined that the state of the uncrewed aerial vehicle is the abnormal offline state. Therefore, compared with an existing solution in which when a maximum delay is configured to determine whether the uncrewed aerial vehicle is in the abnormal offline state, whether the uncrewed aerial vehicle is in the abnormal offline state can be determined only after the maximum delay expires, the location information when the uncrewed aerial vehicle enters or leaves the offline state is used to determine whether the uncrewed aerial vehicle is in the abnormal offline state, so that timeliness and accuracy of determining the abnormal offline state can be improved to some extent.

Figure 3:
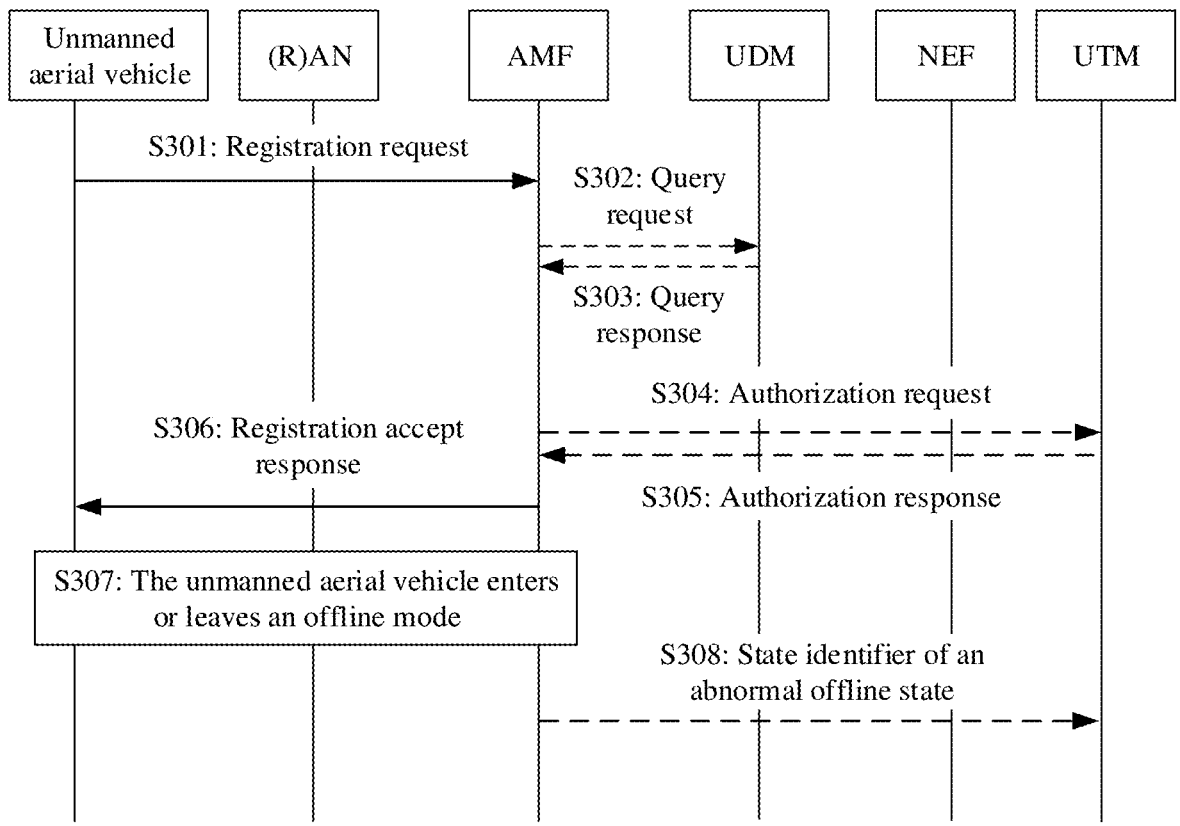
FIG. 3 is a schematic interaction diagram of an abnormal offline state determining method according to an embodiment of this application.

FIG. 3 is a schematic interaction diagram of another abnormal offline state determining method according to an embodiment of this application. As shown in FIG. 3, the abnormal offline state determining method includes steps S301 to S308, which are as follows.

S301: An uncrewed aerial vehicle sends a registration request to an AMF, where the registration request carries a second offline area.

Optionally, when the uncrewed aerial vehicle sends the registration request to the AMF, the second offline area carried in the registration request may be an offline area requested by the uncrewed aerial vehicle. The requested offline area may be understood as an offline area expected by the uncrewed aerial vehicle. The expected offline area may be understood as an area in which the uncrewed aerial vehicle expects to enter an offline state.

Optionally, the registration request may further carry an MICO indication, where the MICO indication is used to indicate that the uncrewed aerial vehicle expects to use an MICO mode.

S302: The AMF sends a query request to a UDM.

The query request is used to query for a subscribed offline area of the uncrewed aerial vehicle from the UDM, and after the subscribed offline area is found, indicate the UDM to send the subscribed offline area to the AMF.

S303: The UDM sends a query response to the AMF, where the query response carries the subscribed offline area of the uncrewed aerial vehicle.

Optionally, after receiving the query response, the AMF extracts the subscribed offline area from the query response, and determines an allowed offline area based on the second offline area and the subscribed offline area of the uncrewed aerial vehicle and with reference to local configuration information, to obtain a third offline area. A method for determining the allowed offline area based on the second offline area and the subscribed offline area of the uncrewed aerial vehicle and with reference to the local configuration information may be: comparing the second offline area with the subscribed offline area, and if the second offline area is the same as the subscribed offline area, using the second offline area as the allowed offline area, to obtain the third offline area; if the second offline area is different from the subscribed offline area, using an intersection of the second offline area and the subscribed offline area as the allowed offline area, to obtain the third offline area. The allowed offline area may alternatively be a subset of the intersection of the second offline area and the subscribed offline area. The allowed offline area may alternatively be a subset of an offline area in the local configuration information of the AMF.

Optionally, after receiving the query response, the AMF may further determine the third offline area based on the extracted subscribed offline area, the second offline area, and a locally configured offline area. Specifically, a subset of an intersection of the subscribed offline area, the second offline area, and the locally configured offline area may be used as the third offline area.

Optionally, after determining the third offline area, the AMF determines the third offline area as the target offline area, where the target offline area is a target offline area stored in the AMF.

In this example, the uncrewed aerial vehicle includes the second offline area in the registration request. The AMF queries the UDM to obtain the subscribed offline area of the uncrewed aerial vehicle, and obtains the third offline area based on the second offline area and the subscribed offline area. Therefore, the uncrewed aerial vehicle may apply for the second offline area from the AMF, and obtain the third offline area (the target offline area) based on the applied offline area, so that the target offline area can be determined based on a requirement of the uncrewed aerial vehicle. In this way, accuracy of determining the target offline area can be improved to some extent.

S304: The AMF sends an authorization request to a UTM, where the authorization request carries the second offline area.

Optionally, after receiving the authorization request sent by the AMF, the UTM extracts the second offline area from the authorization request, and determines an allowed offline area based on the second offline area, to obtain a third offline area. A method for determining the allowed offline area based on the second offline area may be: determining the allowed offline area based on the second offline area and an offline area locally configured by the UTM, to obtain the third offline area. For details, refer to the method for determining the allowed offline area in step S303. Details are not described herein again.

Optionally, a method for determining the allowed offline area by the UTM may alternatively be: determining the allowed offline area based on the second offline area, a locally configured offline area, and subscribed offline area. For details, refer to the specific method in step S303. Details are not described herein again.

S305: The UTM sends an authorization response to the AMF, where the authorization response carries the third offline area.

Optionally, steps S302 and S303 are performed in parallel with steps S304 and S305. That is, if steps S302 and S303 are performed, steps S304 and S305 are not performed; if steps S304 and S305 are performed, steps S304 and S305 are not performed.

Optionally, after receiving the registration request sent by the uncrewed aerial vehicle, the AMF may further determine the third offline area based on the offline area of the uncrewed aerial vehicle that is locally configured by the AMF, the subscribed offline area, and the second offline area carried in the registration request. A method for determining the third offline area may be: using a subset of an intersection of the locally configured offline area and the second offline area as the third offline area. There may be another method for determining the third offline area based on the locally configured offline area and the second offline area. This is merely an example for description herein, and is not specifically limited. If the method for determining the third offline area based on the locally configured offline area and the second offline area is performed, steps S302 and S303 are not performed, and steps S304 and S305 are not performed.

Optionally, after receiving the authorization response, the AMF determines the third offline area carried in the authorization response as the target offline area, where the target offline area is the target offline area stored in the AMF.

S306: The AMF sends a registration accept response to the uncrewed aerial vehicle, where the registration accept response carries the third offline area.

Optionally, the third offline area in the registration accept response sent by the AMF to the uncrewed aerial vehicle may be the third offline area determined in steps S302 and S303 or steps S304 and S305, or may be the third offline area configured by the AMF, or may be any combination of the foregoing offline areas.

Optionally, after receiving the registration response, the uncrewed aerial vehicle determines the third offline area as the target offline area. If the uncrewed aerial vehicle does not store the target offline area before receiving the registration response, the third offline area is used as the target offline area; if the uncrewed aerial vehicle stores the target offline area before receiving the registration response, the target offline area is updated with the third offline area.

Optionally, if the MICO indication is carried in the registration request, the registration accept response may include a MICO indication, where the MICO indication is used to indicate that a network side allows the uncrewed aerial vehicle to use the MICO mode. If the offline state means that the unmanned aerial vehicle may use the MICO mode and be in an idle state, but the network side does not allow the uncrewed aerial vehicle to use the MICO mode, the registration accept response does not carry a first offline area. Alternatively, a first offline area in the registration accept response means that the uncrewed aerial vehicle is not allowed to enter the offline state in all areas.

S307: The uncrewed aerial vehicle enters or leaves the offline state.

For a specific implementation of step S307, refer to the specific implementation of step S205. Details are not described herein again.

S308: The AMF sends a state identifier of an abnormal offline state of the uncrewed aerial vehicle to the UTM.

The state identifier of the abnormal offline state is used to indicate that when the uncrewed aerial vehicle enters or leaves the offline state, a location indicated by location information of the uncrewed aerial vehicle is outside the target offline area.

Before the AMF sends the state identifier of the abnormal offline state to the UTM, the AMF needs to determine a state of the uncrewed aerial vehicle. If determining that the state of the uncrewed aerial vehicle is the abnormal offline state, the AMF sends the state identifier of the abnormal offline state to the UTM. For a method for determining the state of the uncrewed aerial vehicle, refer to the method shown in the foregoing steps A1 to A3, and details are not described herein again.

Optionally, the UTM receives the state identifier that is of the abnormal offline state of the uncrewed aerial vehicle and that is sent by the AMF, and stores the state identifier of the abnormal offline state. The UTM may further perform an action such as displaying the state identifier. For details, refer to the method in step S206. Details are not described herein again.

In this example, the uncrewed aerial vehicle may include the expected offline area (the second offline area) when initiating registration to the network side. The network side obtains the allowed offline area of the uncrewed aerial vehicle (the third offline area) based on the subscribed offline area, the expected offline area, and the locally configured offline area of the uncrewed aerial vehicle, and sends the third offline area (the target offline area) to the uncrewed aerial vehicle, so that the uncrewed aerial vehicle can determine the target offline area during registration, and convenience of obtaining the target offline area can be improved to some extent.

Figure 4:
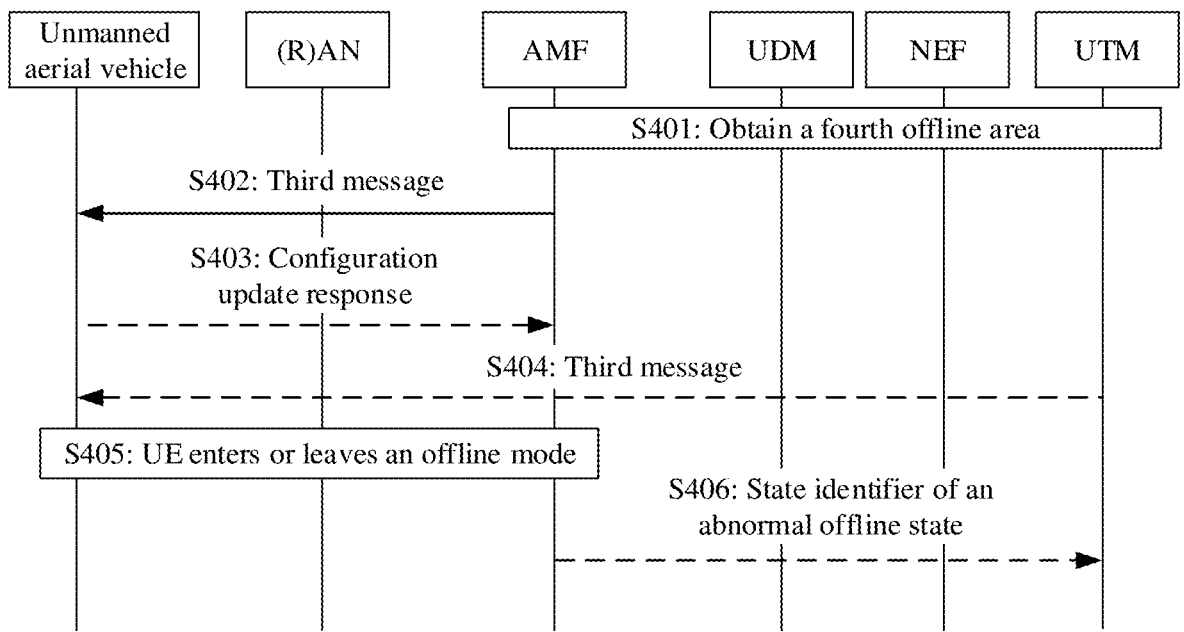
FIG. 4 is a schematic interaction diagram of an abnormal offline state determining method according to an embodiment of this application.

FIG. 4 is a schematic interaction diagram of another abnormal offline state determining method according to an embodiment of this application. As shown in FIG. 4, the abnormal offline state determining method includes steps S401 to S406, which are as follows.

S401: An AMF obtains a fourth offline area of an uncrewed aerial vehicle.

Optionally, when the AMF obtains the fourth offline area, the AMF may receive a fourth offline area sent by a UDM, may receive a fourth offline area sent by a UTM, or may locally configure a fourth offline area. Alternatively, the fourth offline area may be any combination of the fourth offline areas obtained in the three obtaining manners. The fourth offline area may be the same as a first offline area, and may be used to update a target offline area.

S402: The AMF sends a third message to the uncrewed aerial vehicle, where the third message carries the fourth offline area.

S403: The uncrewed aerial vehicle sends a configuration update response to the AMF.

After receiving the third message, the uncrewed aerial vehicle extracts the fourth offline area from the third message, determines the fourth offline area as the target offline area, and sends the configuration update response to the AMF. The configuration update response indicates that the uncrewed aerial vehicle has determined the fourth offline area as the target offline area.

In this example, the AMF directly sends the third message to the uncrewed aerial vehicle, to indicate the uncrewed aerial vehicle to determine the fourth offline area as the target offline area, so that the fourth offline area may be directly sent to the uncrewed aerial vehicle, and efficiency of updating the target offline area can be improved to some extent.

S404: The UTM sends a third message to the uncrewed aerial vehicle, where the third message carries the fourth offline area.

The fourth offline area may be an offline area locally configured by the UTM, or may be a received offline area. This is not specifically limited herein.

Optionally, after receiving the third message, the uncrewed aerial vehicle determines the fourth offline area as the target offline area.

Steps S401 to S403 are performed in parallel with step S404. That is, if steps S401 to S403 are performed, step S404 is not performed; if step S404 is performed, steps S401 to S403 are not performed.

In this example, the AMF directly sends the third message to the uncrewed aerial vehicle, to indicate the uncrewed aerial vehicle to determine the fourth offline area as the target offline area, so that the fourth offline area may be directly sent to the uncrewed aerial vehicle, and efficiency of updating the target offline area can be improved to some extent.

S405: The uncrewed aerial vehicle enters or leaves an offline state.

For a specific implementation of step S405, refer to the specific implementation of step S205. Details are not described herein again.

S406: The AMF sends a state identifier of an abnormal offline state of the uncrewed aerial vehicle to the UTM.

The state identifier of the abnormal offline state is used to indicate that when the uncrewed aerial vehicle enters or leaves the offline state, a location indicated by location information of the uncrewed aerial vehicle is outside a first offline area.

Optionally, before the AMF sends the state identifier of the abnormal offline state to the UTM, the AMF needs to determine a state of the uncrewed aerial vehicle. If determining that the state of the uncrewed aerial vehicle is the abnormal offline state, the AMF sends the state identifier of the abnormal offline state to the UTM. For a method for determining the state of the uncrewed aerial vehicle, refer to the method shown in the foregoing steps A1 to A3, and details are not described herein again.

Optionally, the UTM receives the state identifier that is of the abnormal offline state of the uncrewed aerial vehicle and that is sent by the AMF, and stores the state identifier of the abnormal offline state. The UTM may further perform an action such as displaying the state identifier. For details, refer to the method in step S206. Details are not described herein again.

Figure 5:
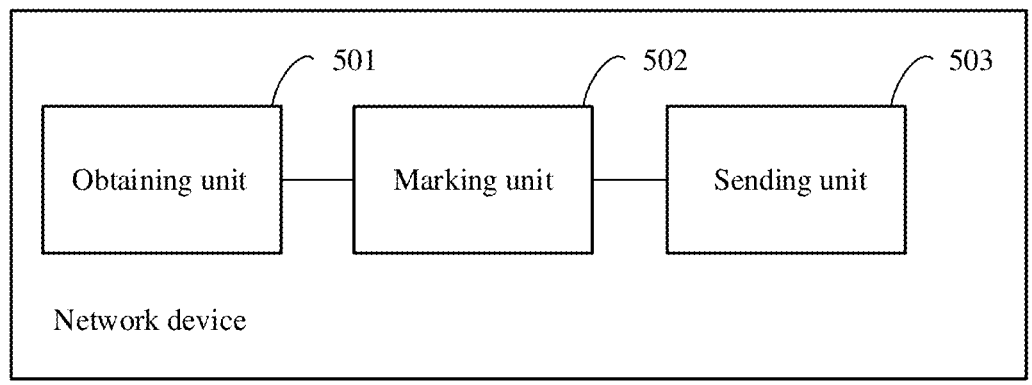
FIG. 5 is a schematic diagram of a structure of a network device according to an embodiment of this application.

FIG. 5 is a schematic diagram of a structure of a network device according to an embodiment of this application. As shown in FIG. 5, the network device includes an obtaining unit 501, a marking unit 502, and a sending unit 503.

The obtaining unit 501 is configured to obtain location information when an uncrewed aerial vehicle enters or leaves an offline state.

The marking unit 502 is configured to mark a state of the uncrewed aerial vehicle as an abnormal offline state if a location indicated by the location information is outside a target offline area.

The sending unit 503 is configured to send a state identifier of the abnormal offline state to an unmanned aircraft system traffic management network element (UTM).

Optionally, the device is further configured to:
receive a first message sent by the UTM, where the first message carries a first offline area; and
determine the first offline area as the target offline area.

Optionally, the device is further configured to:
receive a second message sent by a unified data management network element (UDM), where the second message carries a first offline area, and the first offline area is an offline area received by the UDM from the UTM; and
determine the first offline area as the target offline area.

Optionally, the device is further configured to:
receive a registration request sent by the uncrewed aerial vehicle, where the registration request carries a second offline area, and the second offline area is an offline area expected by the uncrewed aerial vehicle;
send an authorization request to the UTM, where the authorization request carries the second offline area;
receive an authorization response sent by the UTM, where the authorization response carries a third offline area, the third offline area is an allowed offline area determined by the UTM based on the second offline area, and determine the third offline area as the target offline area; and
send a registration accept response to the uncrewed aerial vehicle, where the registration accept response carries the third offline area, and the registration accept response is used to indicate the uncrewed aerial vehicle to determine the third offline area as the target offline area.

Optionally, the device is further configured to:
receive a registration request sent by the uncrewed aerial vehicle, where the registration request carries a second offline area, and the second offline area is an offline area expected by the uncrewed aerial vehicle;
send a query request to a UDM;
receive a query response sent by the UDM, where the query response carries a subscribed offline area of the uncrewed aerial vehicle;
obtain a third offline area based on an allowed offline area determined based on the second offline area and the subscribed offline area of the uncrewed aerial vehicle, and determine the third offline area as the target offline area; and
send a registration accept response to the uncrewed aerial vehicle, where the registration accept response carries the third offline area, and the registration accept response is used to indicate the uncrewed aerial vehicle to determine the third offline area as the target offline area.

Optionally, the device is further configured to:
send a third message to the uncrewed aerial vehicle, where the third message carries a fourth offline area, and the third message is used to indicate the uncrewed aerial vehicle to determine the fourth offline area as the target offline area.

Figure 6:
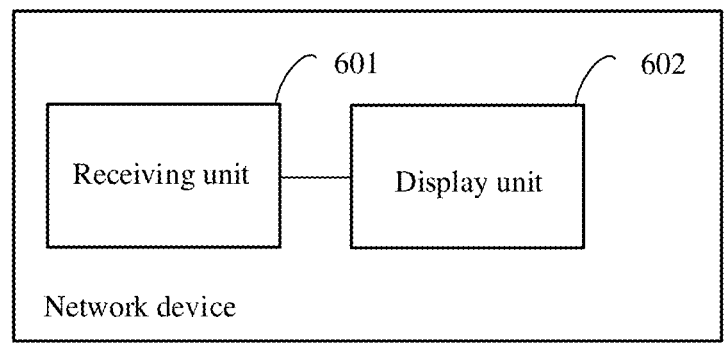
FIG. 6 is a schematic diagram of a structure of another network device according to an embodiment of this application.

FIG. 6 is a schematic diagram of a structure of another network device according to an embodiment of this application. As shown in FIG. 6, the network device includes a receiving unit 601 and a storage unit 602.

The receiving unit 601 is configured to receive a state identifier that is of an abnormal offline state and that is sent by an AMF, where the state identifier of the abnormal offline state is used to indicate that when an uncrewed aerial vehicle enters or leaves an offline state, a location indicated by location information of the uncrewed aerial vehicle is outside a target offline area.

The storage unit 602 is configured to store the state identifier of the abnormal offline state.

Optionally, the device is further configured to:
send a first message to the AMF, where the first message carries a first offline area, and the first message is used to indicate the AMF to determine the first offline area as the target offline area.

Optionally, the device is further configured to:
receive an authorization request sent by the AMF, where the authorization request carries a second offline area, and the second offline area is an offline area expected by the uncrewed aerial vehicle;
determine an allowed offline area based on the second offline area, to obtain a third offline area; and
send an authorization response to the AMF, where the authorization response carries the third offline area, and the authorization response is used to indicate the AMF to determine the third offline area as the target offline area.

Optionally, the device is further configured to:
send a third message to the uncrewed aerial vehicle, where the third message carries a fourth offline area, and the third message is used to indicate the uncrewed aerial vehicle to determine the fourth offline area as the target offline area.

Optionally, the device is further configured to:
send a configuration update request to a UDM, where the configuration update request carries a first offline area of the uncrewed aerial vehicle, and the configuration update request is used to indicate the UDM to determine the first offline area of the uncrewed aerial vehicle as the target offline area; and
receive a configuration update response sent by the UDM, where the configuration update response is used to indicate that the UDM has determined the first offline area as the target offline area.

Figure 7:
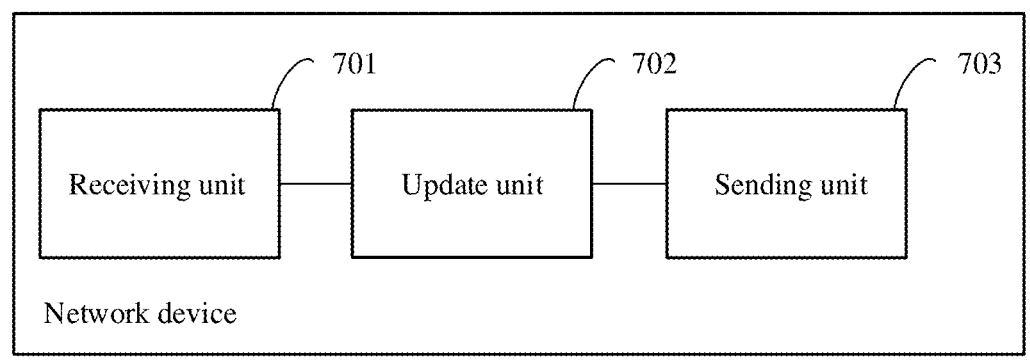
FIG. 7 is a schematic diagram of a structure of another network device according to an embodiment of this application.

FIG. 7 is a schematic diagram of a structure of another network device according to an embodiment of this application. As shown in FIG. 7, the device includes a receiving unit 701, an update unit 702, and a sending unit 703.

The receiving unit 701 is configured to receive a configuration update request sent by a UTM, where the configuration update request carries a first offline area of an uncrewed aerial vehicle.

The update unit 702 is configured to determine the first offline area of the uncrewed aerial vehicle as a target offline area.

The sending unit 703 is configured to send a configuration update response to the UTM, where the configuration update response is used to indicate that a UDM has determined the first offline area as the target offline area.

Optionally, the device is further configured to:
send a second message to an AMF, where the second message carries the first offline area, and the second message is used to indicate the AMF to determine the first offline area as the target offline area.

Optionally, the device is further configured to:
receive a query request sent by an AMF; and
send a query response to the AMF, where the query response carries a subscribed offline area of the uncrewed aerial vehicle.

Figure 8:
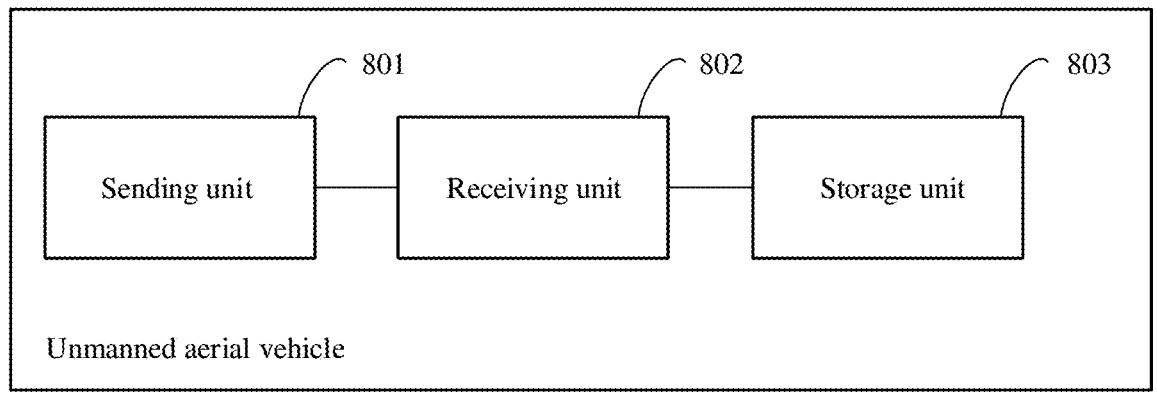
FIG. 8 is a schematic diagram of a structure of an uncrewed aerial vehicle according to an embodiment of this application.

FIG. 8 is a schematic diagram of a structure of an uncrewed aerial vehicle according to an embodiment of this application. As shown in FIG. 8, the uncrewed aerial vehicle includes a sending unit 801, a receiving unit 802, and a determining unit 803.

The sending unit 801 is configured to send a registration request to an AMF, where the registration request carries a second offline area, and the second offline area is an offline area expected by the uncrewed aerial vehicle.

The receiving unit 802 is configured to receive a registration accept response sent by the AMF, where the registration accept response carries a third offline area, and the third offline area is an allowed offline area determined by the AMF based on the second offline area and a subscribed offline area of the uncrewed aerial vehicle, or the third offline area is a third offline area received by the AMF.

The determining unit 803 is configured to determine the third offline area as a target offline area.

Optionally, the uncrewed aerial vehicle is further configured to:
receive a third message sent by the AMF, where the third message carries a fourth offline area; and
determine the fourth offline area as the target offline area.

Optionally, the uncrewed aerial vehicle is further configured to:
receive a third message sent by a UTM, where the third message carries a fourth offline area; and
determine the fourth offline area as the target offline area.

Figure 9:
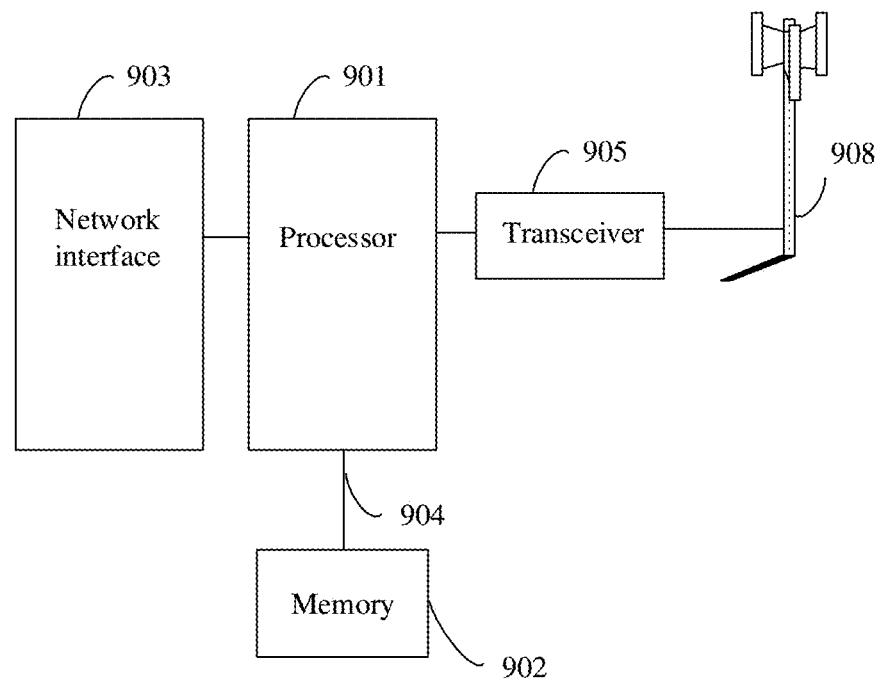
FIG. 9 is a schematic diagram of a structure of a network device according to an embodiment of this application.

FIG. 9 is a schematic diagram of a structure of a network device according to an embodiment of this application. The network device may be the network device in FIG. 5, FIG. 6, or FIG. 7. The network device is configured to perform steps corresponding to steps of the corresponding network device in the foregoing method embodiments. As shown in FIG. 9, the network device 900 may include one or more processors 901, a memory 902, a network interface 903, a transceiver 905, and an antenna 908. These components may be connected through a bus 904 or in another manner. In FIG. 9, an example in which the components are connected through a bus is used.

The network interface 903 may be used by the network device 900 for communicating with another communication device, for example, another network device. Specifically, the network interface 903 may be a wired interface.

The transceiver 905 may be configured to perform transmission processing, for example, signal modulation, on a signal output by the processor 901. The transceiver 905 may be further configured to perform reception processing, for example, signal demodulation, on a mobile communication signal received by the antenna 908. In some embodiments of this application, the transceiver 905 may be considered as a wireless modem. In the network device 900, there may be one or more transceivers 905. The antenna 908 may be configured to: convert electromagnetic energy in a transmission line into an electromagnetic wave in free space, or convert an electromagnetic wave in free space into electromagnetic energy in a transmission line.

The memory 902 may be coupled to the processor 901 through the bus 904 or an input/output port, or the memory 902 may be integrated with the processor 901. The memory 902 is configured to store various software programs and/or a plurality of groups of instructions or data. Specifically, the memory 902 may include a high-speed random access memory, and may further include a non-volatile memory such as one or more magnetic disk storage devices, a flash memory device, or another non-volatile solid-state storage device. The memory 902 may store an operating system (which is briefly referred to as a system below), for example, an embedded operating system such as uCOS, VxWorks, RTLinux, or the like. The memory 902 may further store a network communication program. The network communication program may be used for communication with one or more additional devices, one or more terminal devices, and one or more network devices.

The processor 901 may be a central processing unit, a general-purpose processor, a digital signal processor, an application-specific integrated circuit, a field programmable gate array or another programmable logic device, a transistor logic device, a hardware component, or any combination thereof. The processor 901 may implement or execute various example logical blocks, modules, and circuits described with reference to content disclosed in this application. Alternatively, the processor may be a combination of processors implementing a determining function, for example, a combination of one or more microprocessors or a combination of a digital signal processor and a microprocessor.

In this embodiment of this application, the processor 901 may be configured to read and execute computer-readable instructions. Specifically, the processor 901 may be configured to: invoke a program stored in the memory 902, for example, a program for implementing the abnormal offline state determining method on a side of the network device 900 according to one or more embodiments of this application, and execute instructions included in the program.

It may be understood that the network device 900 may be the AMF, the UTM, and the UDM in the 5G system shown in FIG. 1, and may be implemented as a base transceiver station, a wireless transceiver, a basic service set (BSS), an extended service set (ESS), a NodeB, an eNodeB, a gNB, or the like.

It should be noted that the network device 900 shown in FIG. 9 is merely an implementation of the embodiments of this application, and during actual application, the network device 900 may further include more or fewer components. This is not limited herein. For a specific implementation of the network device 900, refer to related descriptions in the foregoing method embodiments. Details are not described herein again.

Figure 10:
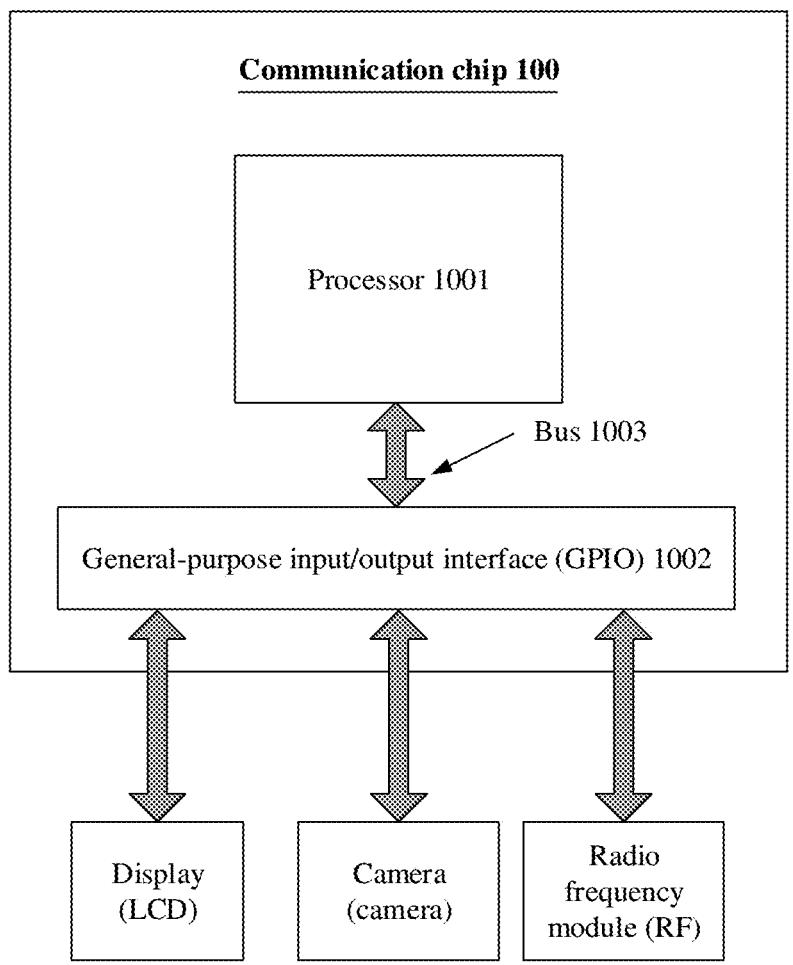
FIG. 10 is a schematic diagram of a structure of a communication chip according to an embodiment of this application.

FIG. 10 is a schematic diagram of a structure of a communication chip according to an embodiment of this application. As shown in FIG. 10, the communication chip 100 may include a processor 1001 and one or more interfaces 1002 coupled to the processor 1001. An example is as follows:

The processor 1001 may be configured to read and execute computer-readable instructions. During specific implementation, the processor 1001 may mainly include a controller, an arithmetic unit, and a register. For example, the controller is mainly responsible for decoding instructions, and sends a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor 1001 may be an application-specific integrated circuit (ASIC) architecture, a microprocessor without interlocked piped stages (MIPS) architecture, an advanced reduced instruction set computing machine (advanced RISC machine, ARM) architecture, an NP architecture, or the like. The processor 1001 may have a single core or a plurality of cores.

For example, the interface 1002 may be configured to input to-be-processed data to the processor 1001, and may output a processing result of the processor 1001. During specific implementation, the interface 1002 may be a general-purpose input/output (GPIO) interface, and may be connected to a plurality of peripheral devices (for example, a display (LCD), a camera (camera), and a radio frequency (RF) module). The interface 1002 is connected to the processor 1001 through a bus 1003.

In a possible implementation, the processor 1001 may be configured to invoke, from a memory, a program or data for implementing the abnormal offline state determining method on a network device side or a terminal device side according to one or more embodiments of this application. In this way, the chip can implement the abnormal offline state determining methods shown in FIG. 2 to FIG. 4. The memory may be integrated with the processor 1001, or may be coupled to the communication chip 100 through the interface 1002. In other words, the memory may be a part of the communication chip 100, or may be independent of the communication chip 100. The interface 1002 may be configured to output an execution result of the processor 1001. In this application, the interface 1002 may be specifically configured to output a decoding result of the processor 1001. For the abnormal offline state determining method provided in one or more embodiments of this application, refer to the foregoing embodiments, and details are not described herein again.

It should be noted that a function corresponding to each of the processor 1001 and the interface 1002 may be implemented by using a hardware design, or may be implemented by using a software design, or may be implemented by combining software and hardware. This is not limited herein.

A communication system is provided. The communication system includes a plurality of devices, the plurality of devices include a network device and an uncrewed aerial vehicle, and the network device includes an AMF, a UTM, a UDM, and the like. For example, the network device may be the network device shown in FIG. 9, and is configured to perform the abnormal offline state determining methods provided in FIG. 2 to FIG. 4, and the uncrewed aerial vehicle is configured to perform the abnormal offline state determining methods provided in FIG. 2 to FIG. 4.

An embodiment of this application further provides a computer storage medium. The computer storage medium may store a program, and when the program is executed, some or all of the steps of any abnormal offline state determining method described in the foregoing method embodiments may be performed.

An embodiment of this application further provides a computer program product. The computer program product includes a non-transitory computer-readable storage medium storing a computer program. The computer program enables a computer to perform some or all of the steps of any abnormal offline state determining method described in the foregoing method embodiments.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

In the foregoing embodiments, descriptions of the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in an electrical form or another form.

Units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the prior art, or all or some of the technical solutions may be implemented in a form of a software product. The computer software product is stored in a memory and includes several instructions for instructing a computer device (which may be a personal computer, a server, a network device, or the like) to perform all or some of the steps of the methods described in the embodiments of this application. The foregoing memory includes any medium that can store program code, for example, a USB flash drive, a read-only memory (ROM), a random access memory (RAM), a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a read-only memory (ROM), a random access memory memory (English: RAM for short), a magnetic disk, an optical disc, or the like.

The embodiments of this application are described in detail above. The principle and implementation of this application are described in this specification by using specific examples. The descriptions about the embodiments are merely provided to help understand the methods and core ideas of this application. In addition, a person of ordinary skill in the art can make variations to this application in terms of the specific implementations and application scopes according to the ideas of this application. Therefore, the content of this specification shall not be construed as a limitation to this application.

What is claimed is:

1. An abnormal offline state determining method, wherein the method comprises:
    a first determining, by an access and mobility management function network element (AMF), whether an uncrewed aerial vehicle enters or leaves an offline state;
    obtaining, by the AMF, location information of the uncrewed aerial vehicle when the uncrewed aerial vehicle enters or leaves the offline state;
    a second determining, by the AMF, whether a location of the uncrewed aerial vehicle indicated by the location information is outside a target offline area in which the uncrewed aerial vehicle is allowed to enter the offline state; and
    when the first determining indicates that the uncrewed aerial vehicle enters or leaves the offline state and the second determining indicates that the location of the uncrewed aerial vehicle indicated by the location information is outside the target offline area:
        marking, by the AMF, a state of the uncrewed aerial vehicle as an abnormal offline state; and
        sending, by the AMF, a state identifier of the abnormal offline state to an unmanned aircraft system traffic management network element (UTM).

2. The method according to claim 1, wherein the method further comprises:
    receiving, by the AMF, a first message sent by the UTM, wherein the first message carries a first offline area; and
    determining, by the AMF, the first offline area as the target offline area.

3. The method according to claim 1, wherein the method further comprises:
    receiving, by the AMF, a second message sent by a unified data management network element (UDM), wherein the second message carries a first offline area; and
    determining, by the AMF, the first offline area as the target offline area.

4. The method according to claim 1, wherein the method further comprises:
    receiving, by the AMF, a registration request sent by the uncrewed aerial vehicle, wherein the registration request carries a second offline area, and the second offline area is an offline area expected by the uncrewed aerial vehicle;
    sending, by the AMF, an authorization request to the UTM, wherein the authorization request carries the second offline area;
    receiving, by the AMF, an authorization response sent by the UTM, wherein the authorization response carries a third offline area, the third offline area is an allowed offline area determined by the UTM based on the second offline area, and determining, by the AMF, the third offline area as the target offline area; and
    sending, by the AMF, a registration accept response to the uncrewed aerial vehicle, wherein the registration accept response carries the third offline area, and the registration accept response indicates to the uncrewed aerial vehicle to determine the third offline area as the target offline area.

5. The method according to claim 1, wherein the method further comprises:
    receiving, by the AMF, a registration request sent by the uncrewed aerial vehicle, wherein the registration request carries a second offline area, and the second offline area is an offline area expected by the uncrewed aerial vehicle;
    sending, by the AMF, a query request to a unified data management network element (UDM);

receiving, by the AMF, a query response sent by the UDM, wherein the query response carries a subscribed offline area of the uncrewed aerial vehicle;

obtaining, by the AMF, a third offline area based on an allowed offline area determined based on the second offline area and the subscribed offline area of the uncrewed aerial vehicle, and determining, by the AMF, the third offline area as the target offline area; and sending, by the AMF, a registration accept response to the uncrewed aerial vehicle, wherein the registration accept response carries the third offline area, and the registration accept response indicates to the uncrewed aerial vehicle to determine the third offline area as the target offline area.

6. An abnormal offline state determining method, wherein the method comprises:

receiving, by an unmanned aircraft system traffic management network element (UTM), a state identifier that is of an abnormal offline state and that is sent by an access and mobility management function network element (AMF), wherein the state identifier of the abnormal offline state indicates that when an uncrewed aerial vehicle enters or leaves an offline state, a location of the uncrewed aerial vehicle indicated by location information of the uncrewed aerial vehicle is outside a target offline area in which the uncrewed aerial vehicle is allowed to enter the offline state; and storing, by the UTM, the state identifier of the abnormal offline state.

7. The method according to claim 6, wherein the method further comprises:

sending, by the UTM, a first message to the AMF, wherein the first message carries a first offline area, and the first message indicates to the AMF to determine the first offline area as the target offline area.

8. The method according to claim 6, wherein the method further comprises:

receiving, by the UTM, an authorization request sent by the AMF, wherein the authorization request carries a second offline area, and the second offline area is an offline area expected by the uncrewed aerial vehicle;

determining, by the UTM, an allowed offline area based on the second offline area, to obtain a third offline area; and sending, by the UTM, an authorization response to the AMF, wherein the authorization response carries the third offline area, and the authorization response indicates to the AMF to determine the third offline area as the target offline area.

9. The method according to claim 6, wherein the method further comprises:

ending, by the UTM, a configuration update request to a unified data management network element (UDM), wherein the configuration update request carries a first offline area of the uncrewed aerial vehicle, and the configuration update request indicates to the UDM to determine the first offline area of the uncrewed aerial vehicle as the target offline area; and receiving, by the UTM, a configuration update response sent by the UDM, wherein the configuration update response indicates that the UDM has determined the first offline area as the target offline area.

10. A network device comprising a processor and a memory, wherein the memory is configured to store an executable instruction that, when the network device operates as an access and mobility management function network element (AMF), causes the processor to execute the executable instruction stored in the memory so that the network device performs operations comprising:

a first determining whether an uncrewed aerial vehicle enters or leaves an offline state;

obtaining location information of the uncrewed aerial vehicle when the uncrewed aerial vehicle enters or leaves the offline state;

a second determining whether a location of the uncrewed aerial vehicle indicated by the location information is outside a target offline area in which the uncrewed aerial vehicle is allowed to enter the offline state; and when the first determining indicates that the uncrewed aerial vehicle enters or leaves the offline state and the second determining indicates that the location of the uncrewed aerial vehicle indicated by the location information is outside the target offline area:

marking a state of the uncrewed aerial vehicle as an abnormal offline state; and sending a state identifier of the abnormal offline state to an unmanned aircraft system traffic management network element (UTM).

11. The network device according to claim 10, wherein the network device further performs:

receiving a first message sent by the UTM, wherein the first message carries a first offline area; and determining the first offline area as the target offline area.

12. The network device according to claim 10, wherein the network device further performs:

receiving a second message sent by a unified data management network element (UDM), wherein the second message carries a first offline area; and determining the first offline area as the target offline area.

13. The network device according to claim 10, wherein the network device further performs:

receiving a registration request sent by the uncrewed aerial vehicle, wherein the registration request carries a second offline area, and the second offline area is an offline area expected by the uncrewed aerial vehicle;

sending an authorization request to the UTM, wherein the authorization request carries the second offline area;

receiving an authorization response sent by the UTM, wherein the authorization response carries a third offline area that is an allowed offline area determined by the UTM based on the second offline area;

determining the third offline area as the target offline area; and sending a registration accept response to the uncrewed aerial vehicle, wherein the registration accept response carries the third offline area, and the registration accept response indicates to the uncrewed aerial vehicle to determine the third offline area as the target offline area.

14. The network device according to claim 10, wherein the network device further performs:

receiving a registration request sent by the uncrewed aerial vehicle, wherein the registration request carries a second offline area, and the second offline area is an offline area expected by the uncrewed aerial vehicle;

sending a query request to a unified data management network element (UDM);

receiving a query response sent by the UDM, wherein the query response carries a subscribed offline area of the uncrewed aerial vehicle;

obtaining a third offline area based on an allowed offline area determined based on the second offline area and the subscribed offline area of the uncrewed aerial vehicle;

determining the third offline area as the target offline area; and sending a registration accept response to the uncrewed aerial vehicle, wherein the registration accept response carries the third offline area, and the registration accept response indicates to the uncrewed aerial vehicle to determine the third offline area as the target offline area.

15. The network device according to claim 10, wherein the network device further performs:

comparing the location indicated by the location information with the target offline area, and if the location indicated by the location information does not exist in the target offline area, determining that the location indicated by the location information is outside the target offline area.

16. The method according to claim 1, wherein the method further comprises:

comparing the location indicated by the location information with the target offline area, and if the location indicated by the location information does not exist in the target offline area, determining that the location indicated by the location information is outside the target offline area.

17. The method according to claim 6, wherein the method further comprises:

sending a deactivation offline message to the AMF to indicate to the AMF to deactivate the offline state of the uncrewed aerial vehicle.

* * * * *